United States Patent Office

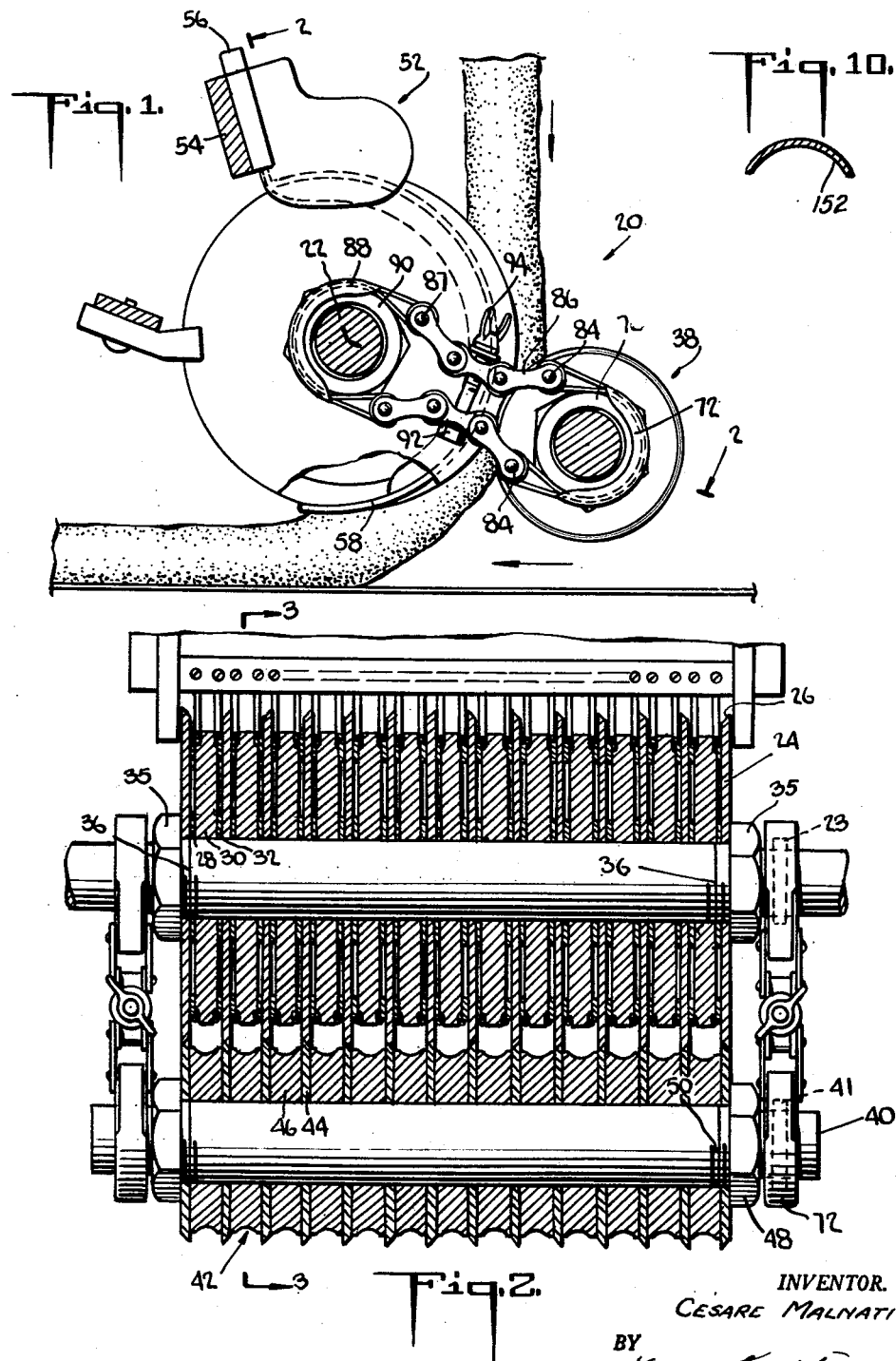

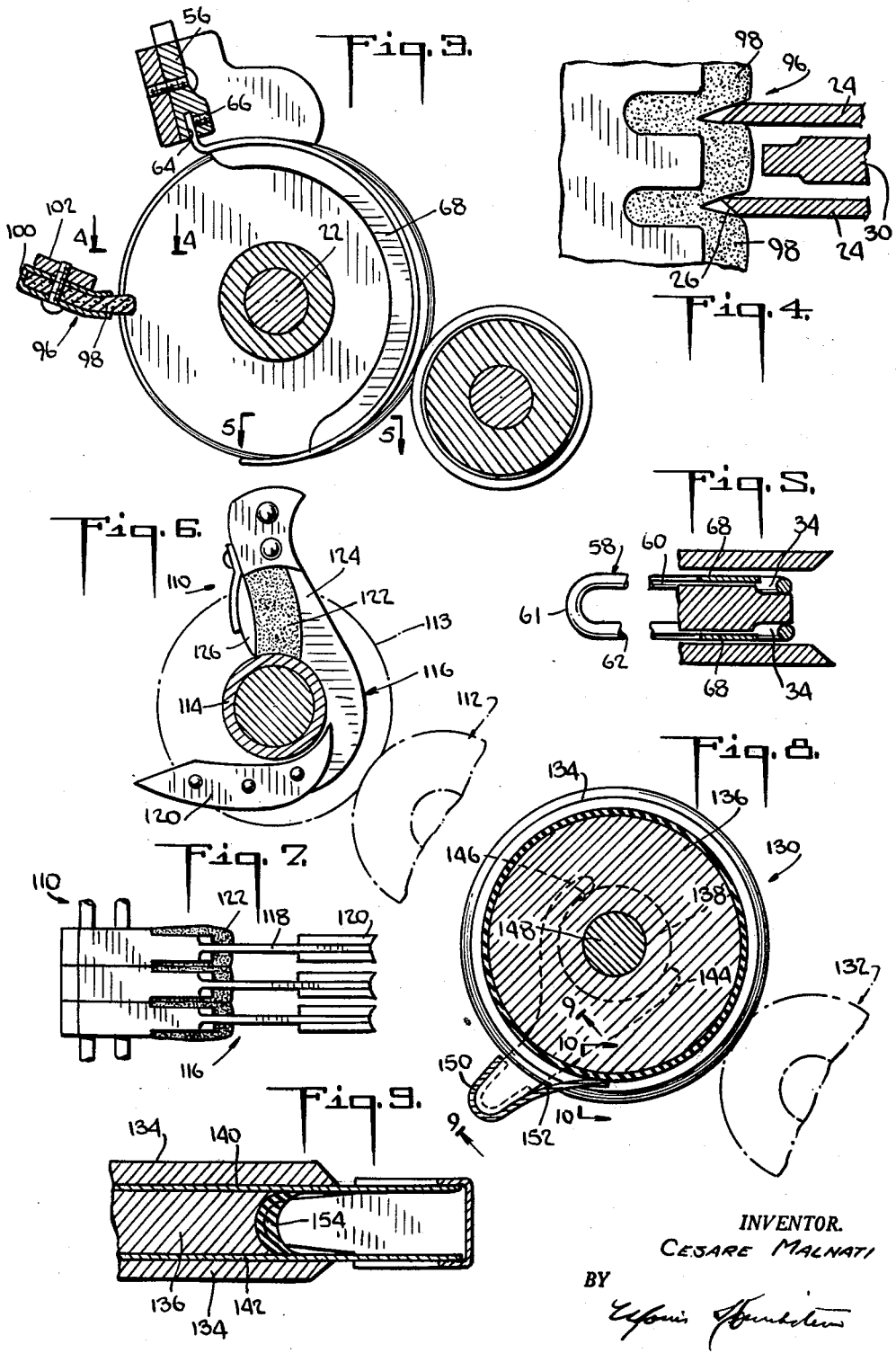

2,923,259
Patented Feb. 2, 1960

2,923,259

DOUGH CUTTING KNIFE

Cesare Malnati, Copiague, N.Y.

Application December 19, 1955, Serial No. 553,972

11 Claims. (Cl. 107—68)

This invention relates to a dough cutting knife. More particularly, my invention pertains to a ganged set of rotary cutting blades which are especially designed for use in making breadsticks, although it will be understood that the invention is not thus specifically limited.

In the manufacture of breadsticks, dough conventionally first is formed as a wad or slab. Thereafter, the dough is sheeted and the sheet cut into a set of narrow parallel strips which are deposited on a spreading conveyor. An apparatus of this nature is illustrated in my U.S. Letters Patent 2,545,667, issued March 20, 1951.

As is pointed out in said patent, the dough used in the manufacture of breadsticks is quick sticky and, accordingly, it is desirable to use special mechanisms for handling the same which prevent the dough from adhering to the parts that come into contact with it and which form and maintain control of predetermined shapes of the unbaked breakstick dough. In this respect the cutting mechanism shown in my aforesaid Letters Patent provides a commercially satisfactory unbaked breadstick strip. However, it does not invariably maintain an exact control over the cross-sectional contour of the strip, and it tends to wear out rapidly, thereby creating a maintenance problem.

It is an object of the present invention to provide an improved cutting mechanism which is not subject to the above mentioned drawbacks.

More particularly, it is an object of my invention to provide a cutting mechanism of the character described which will operate for long periods of time without breakdown or the necessity of replacing parts and which can be run by comparatively unskilled operators.

It is another specific object of my invention to provide a cutting mechanism of the character described which will cleanly separate adjacent uncooked breadstick strips from a sheet and will perform this operation with knife blades having obtuse rather than acute or keen cutting edges and are therefore not susceptible to wear.

It is another specific object of my invention to provide a cutting mechanism of the character described which is capable of shaping uncooked breadstick strips as they are being cut from a sheet and which is so arranged as to minimize any tendency of the dough to adhere to the cutting mechanism.

Other objects of my invention in part will be obvious and in part will be pointed out hereinafter.

My invention accordingly consists in the features of construction, combination of elements and arrangements of parts which will be exemplified in the cutting mechanisms hereinafter described; and the scope of my invention will be indicated in the appended claims.

In the accompanying drawings in which are shown various possible embodiments of my invention:

Fig. 1 is a side view of a cutting mechanism constructed in accordance with the present invention, the ends of the shafts and supporting bars being broken away;

Fig. 2 is a sectional view taken substantially along the line 2—2 of Fig. 1;

Fig. 3 is a sectional view taken substantially along the line 3—3 of Fig. 2;

Figs. 4 and 5 are enlarged fragmentary detail views taken substantially along the lines 4—4 and 5—5 respectively, of Fig. 3;

Fig. 6 is a view similar to Fig. 3 of a cutting mechanism embodying a modified form of my invention;

Fig. 7 is a fragmentary top view of the stripper employed in the cutting mechanism of Fig. 6;

Fig. 8 is a view similar to Fig. 6 of a cutting mechanism embodying another modified form of my invention; and Figs. 9 and 10 are enlarged fragmentary sectional views taken substantially along the lines 9—9 and 10—10, respectively, of Fig. 8.

Referring now in detail to the drawings and more particularly to Figs. 1–5, the reference numeral 20 denotes a cutting mechanism embodying my invention and designed for use in an apparatus such as shown in my aforesaid U.S. Letters Patent 2,545,667. Said cutting mechanism is adapted to replace the cutting mechanism constituting the platen designated by the reference numeral 25 and the knives designated by the reference numeral 26 in said patent.

The cutting mechanism of the present invention includes a drive shaft 22 which replaces the shaft 28 in said patent. The shaft 22 is supported at its ends in bearings not shown in the drawings forming part of this application but illustrated in the aforesaid Letters Patent. Said shaft 22 is suitably driven as by a chain and sprocket (not shown).

Mounted on the shaft with their planes perpendicular to the longitudinal axis thereof are a plurality, i.e. a gang, of metal discs 24. The discs are of identical diameters and are similarly positioned on the shaft so that the centers and the peripheries of the discs are registered parallel to the longitudinal axis of the shaft. Said discs function as knives. However, the discs are not, as are conventional knives, e.g., the knives of my said patent, provided with keen cutting edges. It has been found that where knives with such edges are employed, they quickly cut grooves in the cooperating platen and necessitate frequent, often daily, replacement thereof. Moreover, there is a tendency on the part of the sticky dough used for breadsticks to adhere to thin keen cutting edges.

I have avoided the foregoing difficulties by forming the peripheries of the knife discs 24 with comparatively blunt, i.e. obtuse, cutting edges 26. These edges are generally in the shape of the frustum of a cone. That is to say, the periphery of each disc tapers axially in only one direction, the angle of taper being small in comparison with the dual angles of taper in an ordinary cutting knife. A typical taper angle for knife blades embodying the present invention is 60° to the plane of the disc and a typical thickness for the disc is one-sixteenth of an inch. By virtue of the construction described one face of the disc is of greater diameter than the other face so that the disc constitutes a thin frustum of a cone.

Although it is not essential to the operation of my invention, I prefer to have the peripheries of some of the discs taper in one direction and the peripheries of the remainder of the discs taper in the opposite direction, the best arrangement being that in which about half of the discs have their peripheries tapering in one direction and the other half in the opposite direction. This arrangement minimizes axial thrust in the bearings for the drive shaft.

The discs are spaced apart a proper distance for formation of uncooked breadstick strips of a desired predetermined width. Any suitable means may be employed to hold the discs apart. For example, between each pair of cutting discs I have interposed three spacing elements 28, 30, 32. The side elements 28, 32 simply constitute small spacing collars and accordingly have a diameter which is considerably less than the minimum diameter of the discs. The central element 30 has a diameter greater than that of the spacing collars but somewhat less than the minimum diameter of the discs, the purpose of this relative dimensioning being pointed out hereinafter. The central element also is provided with annular grooves 34 (see Fig. 5) on opposite faces thereof at the periphery of the elements. Each of the spacing elements includes a central opening which passes the shaft 22.

The spacing elements and discs are stacked on the shaft, as best seen on Fig. 2, and are clamped together and rigidly secured to the shaft, as by clamping nuts 35 screwed on spaced threaded portions 36 adjacent opposite ends of the shaft. Accordingly, when the shaft 22 is rotated by its associated chain and sprocket, the discs will be revolved.

Further pursuant to my invention, the cutting mechanism 20 also includes a unique platen 38 with which the ganged knives cooperate. Said platen comprises a shaft 40 whose ends are supported in a manner which will be described hereinafter. The shaft 40 carries a platen roller 42 of generally cylindrical shape but having a configuration which includes portions matching the peripheries of the discs 24 and intermediate set-back portions. To simplify construction, the disc engaging portions of the platen constitute discs 44, and the set-back portions of the platen constitute spacing collars 46 having concave peripheries and maximum diameters less than the maximum diameter of the knife-engaging discs 44. The discs 44 and collars 46 are centrally apertured to admit the shaft 40, and are stacked in alternation on the shaft, being secured thereto as by clamping nuts 48 which are screwed on threaded portions 50 near opposite ends of the shaft.

Each of the platen discs 44 engages a different one of the knife discs 24 and the periphery of each platen disc 44 is formed with a frusto-conical surface that approximately matches the frusto-conical surface of its associated knife disc. The discs of each pair of associated discs 24, 44 are in substantially planar registration. The slopes of the different platen discs 44 match those of the associated cutting discs so that about half of said platen discs have peripheries which slope in one direction and the remainder have peripheries which slope in the opposite direction. The spacing collars 46 have concave peripheries which approximately match the contour desired to be imparted to the under surfaces of the uncooked breadstick strips as they leave the cutting mechanism.

Although this use of matching sloped obtuse cutting and platen discs squeezes rather than cuts the dough when changing it from sheet to multi-strip form, I have found that the separation into strips is quite satisfactory and has several advantages over rotary knives having sharp cutting edges. One marked advantage is that it creates a great reduction in wear of the platen. Another advantage is that there is less tendency for the dough to stick to the cutting discs and platen, this being due, it is believed, to the fact that the squeezing action tends to push the uncooked dough away from the knife discs, whereas a cutting action tends to submerge the knives in the dough.

It will be observed that since the separation of the dough into strips is the result of a squeezing action, both the knife discs and platen discs can be made of metal. Moreover, because the discs roll flatly on one another without giving rise to any shearing action very little wearing takes place. Consequently, the knife and platen discs hardly ever require replacement.

By rolling the concave peripheries of the spacers 46 on the undersurface of the dough strips as they are formed by squeezing, I am able to shape the said surfaces as desired, while minimizing the tendency of the dough to stick. For contouring the upper surface of the uncooked strips, i.e., the side which is uppermost on the separating conveyor, and to aid in guiding the formed strips away from the ganged knife discs, I provide a stripper rack 52 including a transverse bar 54 the ends of which are supported on stationary elements (not shown) on the frame of the machine. A plate 56 attached to the bar carries a series of wire stripping fingers 58, each finger constituting a pair of parallel arcuate wire reaches 60, 62 connected at their tips by U-bends 61 and having their opposite ends received in bores 64 (Fig. 3) in the plate 56 where they are anchored, as by set screws 66. Each stripping finger is of approximately circular outline (Fig. 3) from its anchored end at the plate to its free end at the retroverted bend.

The plate 56 is located approximately over the shaft 22, so that the bends 61 are located approximately directly beneath said shaft. The curvature of the stripping fingers is such that the tips thereof extend rearwardly in substantially a horizontal direction and are disposed at approximately the peripheries of the cutting discs whereby said fingers guide the separated uncooked dough strips away from the cutting mechanism at the point where said strips normally would tend to leave the cutting discs. The stripping fingers are set back adjacent the platen roller, i.e., are spaced inwardly from the peripheries of the cutting discs (see Fig. 3), so that in the zone where the sheet of dough is separated into strips, said fingers are clear of the circumferences of the cutting discs (see Fig. 2) and permit the strips to swell in height as they are separated by the squeezing action.

Indeed it is to receive said fingers in a position behind the arcuate surface of the central spacing element 30 where they will not interfere with movement of the strips in the separating zone that the annular grooves 34 are provided.

The reaches 60, 62 carry outer shielding plates 68 (see Fig. 5) which cover the side faces of the associated central element 30 adjacent the periphery thereof. The stripping fingers as thus constituted, i.e. comprising the reaches 60, 62 and the shielding plates 68, substantially completely fill the spaces between the sides of the center spacing element 30 and the adjacent surfaces of the cutting discs whereby no crevices are left into which the tacky breadstick dough can penetrate as the strips are squeezed out of the dough sheet.

I have found that the presence of stationary fingers in their recessed positions at the sides of the rotating center spacing element 30 does not tend to retard movement of the dough or to form a surface to which the dough will adhere. However, the tips of the stripping fingers, although stationary, supply the necessary additional slight force that insures a clean separation of the strips from the cutting mechanism, and do not cling to the dough which at this point is ready to leave the cutting discs. The tips of the stripping fingers leave their impression on the pliant separated dough strips so that any desired ultimate shape can be imparted to the tops of the breadstick strips.

The enlarged portions 41 adjacent the ends of the platen shaft 40 are journalled in bearings 70 (see Fig. 1) which desirably are carried from the cutting shaft 22. More specifically, each bearing 70 lies in a cradle 72 comprising a doubled resilient metal strip shaped in form of a U to receive the bearing. Both edges of the outer half of the strip are inturned to provide constraining side flanges that prevent axial shifting of the bearing. The loops at the ends of the cradle engage pins 84 which constitute one set of ends of two short link chains 86. The pins 87 at the other ends of the two chains engage the loops at the ends of a second resilient cradle 88 that embraces a bearing 90 in which an enlarged end portion 23 of the cutting shaft is journalled.

Suitable means, such for instance, as a bolt 92 and wing nut 94, urge the two chains 86 toward one another and by thus shortening the effective length of chain between the cradles presses the platen discs against the cutting discs with a selectively adjustable resilient force. The platen discs are not driven except by the cutting discs.

I preferably include in the cutting mechanism 20 a wiping means 96 (see Figs. 3 and 4) for cleaning the cutting discs as they turn so that a fresh surface always is presented to the sheet of uncooked dough. Said wiping means conveniently constitutes a strip 98 of a fibrous absorbent material such, for instance, as felt which is slitted at suitable intervals to receive the peripheries of the cutting discs. The felt strip is secured in any suitable manner, for example, in an elongated holder 100 of U-shaped cross section. Said holder is attached to a bar 102 that is fastened to the stationary frame.

As has been noted earlier, the dough is transformed from sheet into strip form by the squeezing action of the blunt peripheral edges of the coplanar cutting and platen discs which displace the dough laterally and, since the discs form restraining side walls at the point of squeezing, radially, so that the strip as it is squeezed expands in height and comes into contact both with the contour spacer 46 between the platen discs and the center spacers 30 between the cutting discs.

Where the shape of the upper surface of the breadstick can be sufficiently contoured by the rolling action of the center spacer, where only slight pressure is exerted against the dough by the tips of the stripping fingers, and where the dough is not unduly tacky, the use of wire stripping fingers 58 such as described is satisfactory. However, under certain circumstances, e.g., if the dough is quite tacky, or if the entire upper surface of the breadstick strip must be contoured and, accordingly, greater pressure exerted on the dough, I prefer to utilize an alternate form of cutting mechanism 110 such as is shown in Figs. 6 and 7.

Said mechanism 110 includes a platen 112 identical to the platen 38 and cutting discs 113 identical to the cutting discs 24. The cutting discs are held apart by small-diameter spacing collars 114 which extend all the way between the discs, the central spacing elements 30 of the first described form of my invention being omitted. The cutting mechanism 110 utilizes stripping fingers 116 which are scimitar-shaped plates 118 that carry plastic sectors 120 at their forward ends on both faces thereof. The sectors are made from any suitable synthetic plastic, e.g., cellulose acetate, cellulose acetate butyrate, an acrilo nitrite resin, or a phenol formaldehyde condensation resin. All unfilled standard synthetic plastics when smoothly finished as, for instance, by molding or by lapping, are characterized by the ability of quite tacky breadstick dough to smoothly slide in contact with the same without sticking. Hence, the edges of the sectors 120 which contact the formed strips and impart any desired contour to the upper surface thereof will not stick to the dough. A typical shape of sector which will provide a smooth convex top surface to the strip is shown, for instance, in Fig. 7.

The sectors 120 and the associated portion of the edge of the plate 118 are located directly below the shaft carrying the cutting discs 113 and extend horizontally rearwardly so that shortly after the strips are formed they will be separated from the cutting mechanism by the stripping fingers 116 and concurrently have their upper surfaces contoured to the desired shape.

The wiping means for the cutting mechanism 110 constitutes a felt strip 122 located in a notch in the tang 124 of the plate 118 so that portions of the strip are located on opposite sides of said plate. These portions are held flat against the faces of the plate by a U-shaped clamping member 126. The felt is so located as to wipe oppositely facing surfaces of adjacent cutting discs 113 whereby said discs will present a clean edge to the dough sheet as they engage the same.

Still another form of cutting mechanism 130 embodying my invention is shown in Figs. 8–10. Said mechanism 130 has a platen 132 identical to the platen 38 and cutting discs 134 identical to the cutting discs 24. The cutting mechanism 130 includes, however, an improved stripping means. Such means constitutes a central spacer element 136 in the form of a thick metal disc having short axle portions 138 which hold adjacent cutting discs apart, while maintaining a thin gap between the sides of the spacer element and the sides of the discs. In the gaps thus formed, I locate a pair of thin arms 140, 142 each having a gripping fork 144 the inner periphery 146 whereof rotatably engages the axles 138 and tips which project beyond the discs 134. In this manner, the arms are able to rotate freely around the cutting shaft 148 to which the cutting discs and spacer elements are secured.

Both arms are similarly tapered toward their tips to engage a cap 150 from which a tongue 152 slopes toward the space between the pair of associated cutting discs. It will be clear that with the tongue held stationary, the cutting discs and spacer element 136 can turn together relative to it.

An elastomeric tire 154 is seated in the concave periphery of the spacer element 136. Said tire is shaped to present a concave external surface. The side edges of the tire normally press against the oppositely facing surfaces of the associated cutting discs; however, the tire is sufficiently flexible to permit the passage of the thin arms 142 as the cutting discs turn. The tip of the tongue 152 is feathered and shaped to a convex form which matches and lightly engages the concave circumference of the tire. Said tongue is externally concave (see Fig. 18), the shape thereof substantially conforming to the external configuration of the tire in order to preserve the shape imparted to the unbaked breadstick strip.

In operation the projecting portion of the arms 142 are so located that the tongue 152 is approximately horizontal and its feathered tip lightly touches the tire almost directly below the shaft 148. Soft dough squeezed between adjacent cutting discs will well up against the tire and thereby have its upper surface properly contoured, this contour being maintained as it is stripped from the tire by the tongue.

It thus will be seen that I have provided devices which achieve the several objects of my invention and are well adapted to meet the conditions of practical use.

As various possible embodiments might be made of the above invention and as various changes might be made in the embodiments above set forth, it is to be understood that all matter herein described or shown in the accompanying drawing is to be interpreted as illustrative and not in a limiting sense.

Having thus described my invention, I claim as new and desire to secure by Letters Patent:

1. A dough cutting knife comprising a gang of rotary cutting discs having obtuse frusto-conical peripheries and a platen including a gang of rotary platen discs with obtuse peripheries of matching frusto-conical contour, each cutting disc being associated with and in rolling engagement on a different platen disc, the peripheries of approximately half of the cutting discs of each gang sloping in one direction and the peripheries of the remainder in the opposite direction.

2. A dough cutting knife comprising a gang of rotary cutting discs having obtuse peripheries, a platen including a gang of rotary platen discs with obtuse peripheries, each cutting disc being associated with and in rolling engagement on a different platen disc, and a stripper between each adjacent pair of cutting discs, each stripper constituting a finger having a tip lying beneath the axis of rotation of the cutting discs adjacent the peripheries thereof and extending in a substantially horizontal direction away from the platen.

3. A dough cutting knife as set forth in claim 2 wherein each stripper extends downwardly between the associated pair of cutting discs alongside the zone where the platen and cutting discs are in rolling engagement.

4. A dough cutting knife comprising a gang of cutting discs having obtuse peripheries, a shaft on which the discs are mounted in circumferential registration with each other, means to maintain said discs spaced apart axially of the shaft, said means including spacer elements fixed to the shaft between the discs, a platen including a gang of platen discs with obtuse peripheries, each platen disc being associated with a different cutting disc and being coplanar therewith and in rolling engagement thereon, and a stripping finger between each pair of adjacent cutting discs, each stripping finger including a pair of slender arcuate reaches joined by a retroverted bend, each reach lying on a different side of a spacer element, the retroverted bend extending away from the zone wherein said discs have rolling engagement in an approximately horizontal direction adjacent the peripheries of the cutting discs and being located below the shaft.

5. A dough cutting knife as set forth in claim 4 wherein the spacer elements are spaced from the adjacent cutting discs and wherein each reach is provided with a shielding plate which, together with the reach, substantially fills the space between the spacer element and the adjacent cutting disc.

6. A dough cutting knife as set forth in claim 4 wherein the reaches have portions passing alongside the zone where the platen discs roll on the cutting discs and wherein said portions are located to be out of contact with dough strips formed by coaction between the discs.

7. A dough cutting knife comprising a gang of rotary cutting discs having obtuse peripheries, a platen including a gang of rotary platen discs with obtuse matching peripheries, each platen disc being associated with a different cutting disc, being in coplanar alignment therewith and rolling thereon, and a stripper between each adjacent pair of cutting discs, each stripper constituting a blade having mounted on opposite surfaces thereof sectors formed of a synthetic plastic material, said sectors defining a contoured edge adapted to engage dough after it has been formed into strips by coaction between the cutting and platen discs, said contoured edge being smooth, lying beneath the axis of rotation of the cutter discs adjacent the peripheries of the discs and extending in a horizontal direction away from the platen.

8. A dough cutting knife comprising a gang of rotary cutting discs having obtuse peripheries, a platen including a gang of rotary platen discs with obtuse matching peripheries, each platen disc being associated with a different cutting disc, being in coplanar relationship therewith and rolling thereon, a spacer element located between each pair of cutting discs, each spacer element being provided with spacing means on opposite sides thereof adjacent its center for holding the discs apart a distance in excess of the thickness of the spacer element whereby a gap is provided between each side of the spacer element and the adjacent cutting disc, a pair of thin arms, each arm being located between a different side of the spacer element and an adjacent disc, said arms being mounted to turn relative to the discs and spacer element, an elastomeric tire mounted on each spacer element and overlying the gaps and having the side edges thereof touching the oppositely facing sides of the cutting discs whereby to permit said arms to turn as aforesaid, the tips of each of said arms extending beyond the peripheries of said tires, and a stripping finger carried by the tips of the arms and having a tongue extending toward and in light engagement with the peripheries of said tires, said tongues being located beneath the centers of the cutting discs and extending away from the platen.

9. A dough cutting knife as set forth in claim 8 wherein the external surface of the tire is concave and the engaging tip of the tongue is contoured to match.

10. A dough cutting knife comprising a gang of rotary cutting discs all of which have obtuse shaped peripheries and a platen including a gang of rotary platen discs all of which have obtuse shaped peripheries, each cutting disc being associated with a different platen disc, said cutting discs and platen discs being mounted for rotary movement about parallel axes, each cutting disc being in continuous peripheral rolling engagement with its associated platen disc, each cutting disc being of the same thickness as its associated platen disc, each cutting and platen disc having two broad side faces, one broad side face of each cutting disc being coplanar with one broad side face of the associated platen disc, the other broad side face of each cutting disc being coplanar with the other broad side face of the associated platen disc, the shape of the obtuse periphery of each cutting disc matching the shape of the obtuse periphery of the associated platen disc, and each platen disc engaging the associated cutting disc across the entire thicknesses of said two discs where they are in continuous rolling engagement with one another, whereby dough entering the bite between each associated pair of discs will be squeezed out at the area of rolling engagement of said discs when said discs are turned.

11. A dough cutting knife as set forth in claim 10 wherein each pair of associated cutting and platen discs have matching obtuse frusto-conical peripheries.

References Cited in the file of this patent

UNITED STATES PATENTS

| | | |
|---|---|---|
| 812,704 | De Vito | Feb. 13, 1906 |
| 986,878 | Vessot et al. | Mar. 14, 1911 |
| 1,210,496 | Lawrence | Jan. 2, 1917 |
| 1,496,880 | Hohberger | June 10, 1924 |
| 1,779,580 | Baccellieri et al. | Oct. 28, 1930 |
| 2,248,291 | Walborn | July 8, 1941 |
| 2,259,943 | Tanzi | Oct. 21, 1941 |
| 2,292,723 | Stocker | Aug. 11, 1942 |
| 2,593,542 | Curioni | Apr. 22, 1952 |
| 2,599,894 | Campbell | June 10, 1952 |
| 2,714,861 | Castronuovo | Aug. 9, 1955 |